United States Patent Office 3,417,056
Patented Dec. 17, 1968

3,417,056
METHOD OF IMPROVING THE PROPERTIES OF MACROMOLECULAR POLYMERS BY REACTION WITH POLYFUNCTIONAL ALDEHYDES
Christian P. Pinazzi, René Pautrat, Roland Cheritat, and Paul Branlard, Paris, France, assignors, by mesne assignments, to Societe Nationale des Petroles d'Aquitaine Tour Aquitaine (France)
No Drawing. Filed Feb. 27, 1964, Ser. No. 347,704
Claims priority, application France, Feb. 27, 1963, 926,208
5 Claims. (Cl. 260—73)

ABSTRACT OF THE DISCLOSURE

Natural and synthetic rubber is modified by reaction with a polyfunctional aldehyde, that is an aldehyde containing an electro negative group such as a halogen. The thus modified rubber products have improved resistance to solvents, improved compatibility with polymer modifiers, and changed chemical reactivity which permits reticulation of the modified polymer by means of multifunctional reagents such as diamines and disocyanates. Modified rubber which is substantially incombustible is also made by this process.

---

The chemical modification of natural rubber by fixation of formaldehyde is based on a relatively old idea (cf. F. Kirchhol—Chem. Zeitung, 47, 153, 1923).

The patents concerning the commercial application of this reaction describe the fixation of the formaldehyde or acetaldehyde only from their polymers, this fact being easily accounted for by the difficulty of producing and utilizing the monomer in the pure state. Thus, the following patents: British Patents Nos. 348,303 (1931), 371,339 (1932), 523,734 (1940) and U.S. Patent No. 2,417,424 (1947) and may be cited by way of example in this connection.

Now it is known that the decomposition within the rubber mass of polymers such as trioxymethylene or paraformaldehyde is only partial so that eventually only complex mixtures are obtained. Moreover, the fixation of the aforesaid aldehydes imparts only a limited chemical reactivity to the modified macromolecule.

The same remark applies to the modifications advocated for copolymers such as butyl rubber (French Patent No. 1,259,093 of Apr. 28, 1960).

The present invention relates to the preparation of new natural-rubber derivatives and new synthetic elastomer derivatives having original chemical and technological properties.

More particularly, this invention relates to the fixation of highly "electrophilous" aldehydes on non-saturated macromolecules. These high polymers must have in addition a favorable structure of their double ethylenic links, characterized by a high electronic density. This specific configuration is found in natural polyenes (India rubber, gutta percha) or synthetic polyenes (polyisoprenes, polybutadienes, butadiene-styrolene copolymers, isobutyleneisoprene, etc.).

According to the nature and amount of combined aldehyde, elastomeric or resinous products can be obtained. The improvement resulting from the chemical transformations described in this invention applies notably to the following characteristics:

Resistance to solvents;
Incombustibility of the products modified by considerable amounts of halogenated aldehydes;
Compatibility with certain inorganic or organic charges (i.e. phenoplast and aminoplast resins) and also with other polymers;
Possibility of obtaining new chemical reactions from modified rubbers. More particularly, reticulation by means of multifunctional reagents permits a characteristic curing of each structure.

The method of this invention consists in reacting highly electrophilous aldehydes with high-electron $>C=C<$ double links included in a macromolecular chain, with the result that the aldehyde molecules are fixed on said chain. The aldehydes utilized to this end are also characterized by different chemical functions bringing forth their specific reactivity to the modified macromolecule. On the other hand, the alteration of the high-polymer structure is avoided by protecting same against cleavages or reticulations caused by oxygen or free radicals, by operating in an inert atmosphere.

Aldehydes having the general formula R—CHO are used of which the reactivity is such that, as a rule, they are stable only in the form of hydrates or polymers. In this formula R comprises a strongly electro-negative group, for example a halogen group (halogen derivatives of acetaldehyde such as chloral, bromal, fluoral, etc.) a —CO— group (glyoxal and its alkylated derivatives).

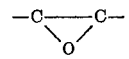

(glycidic aldehyde, di-crotonic aldehyde), X—$C_6H_4$ or $X_2$—$C_6H_3$ (4-fluorobenzaldehyde, 2–4 dichlorobenzaldehyde) X being a halogen.

According to the nature of the aldehyde used in the process the reaction requires or not the presence of ionic catalysts which are acids (ex: HCl, $H_2SO_4$, $H_3PO_4$, $Cl_3C$—COOH, etc.) or anhydrous metallic halides ($AlCl_3$—$AlBr_3$—$BF_3$) either in the pure state or in the compound state with $(C_2H_5)_2O$ or

etc.; if desired, double eutectic chlorides such as $AlCl_3$—NaCl may be used. With certain aldehydes (chloral, bromal) and certain polymers (poly-butadiene) peroxidic catalysts may be used to produce a radicalary reaction.

The reactions are effected with monomeric aldehyde or with a more stable form of the aldehyde, capable of regenerating the aldehyde by simply heating same (hydrate, polymer). The polymer to be modified may be used in solution, suspension or in the solid state. In all cases atmospheric oxygen is eliminated from the reaction medium by degassing in vacuo. This oxygen may also be displaced by using an inert gas such as de-oxygenated nitrogen or argon. When a synthetic elastomer is used it may be advantageous to eliminate the polymerization residues as well as the anti-oxygens contained therein by performing a series of extractions with acetone, of solutions in benzene and reprecipitations with methanol. Natural rubber when used in this process may be the commercial product or a deproteinized crepe rubber having particularly low nitrogen and ash contents.

The solution reactions take place in inert solvents such as anhydrous and peroxide-free cyclohexane or decalin. If desired, aromatic high-boiling solvents such as xylene may be used. The reaction is effected in nitrogen-vacuumized sealable tubes or under ordinary pressure in an inert gas atmosphere. The aldehyde is fixed on the polymer by heating at 80° to 240° C. according to the nature of the reagents and catalysts. After the reaction the modified polymer is precipitated from its solution by ing a non-solvent substance such as methanol. The purification of the material consists in eliminating the excess of unreacted aldehyde, and possibly the catalyst. This purification is obtained by extracting the reaction product by means of a solvent of the aldehyde (water, acetone, alcohol) that will not dissolve the rubber or caoutchouc, or by using a series of solutions of the modified rubber (benzene, chloroform) and successive reprecipitations (methanol). The purified product is dried in vacuo until its weight becomes constant and its elementary composition is determined by using conventional analytical means and methods. The fixation rate $n$ ($n$=number of reagent molecules fixed per 100 elementary units of the macromolecular chain) is deducted therefrom. The index $n$ is given by the formula $$n = \frac{m \times a}{M(100-a)} \times 100$$

wherein:

$m$=mass of the elementary unit of the macromolecular chain, for example $m$=68 in the case of polyisoprenes $(C_5H_8)_n$;
$M$=molecular mass of the aldehyde;
$a$=percentage by weight of aldehyde fixed on the chain, as determined from the elementary analysis of the reaction product.

Moreover, spectrographic analyses in the infrared wavelength range permit of determining the nature of the chemical groups introduced into the thus modified polymer.

In an alternate form of embodiment of the reaction process it is also possible to operate in the solid phase. A stable derivative of the aldehyde which is capable of regenerating this aldehyde by simply heating same is introduced by stirring into the polymer; non-limiting examples of such derivatives are chloral hydrate, metachloral, polymethylglyoxal, etc., The reaction is subsequently obtained by heating the mixture in metal flasks (30 minutes to 3 hours at a temperature ranging from 150° to 220° C.) or still in a special mixer (Buss Ko-mixer) permitting a very strong stirring of the reagents protected from oxygen (heating at a temperature ranging from 150° to 220° C. during 3 to 30 minutes). The purification of the thus purified polymers is subsequently effected in the manner set forth hereinabove.

The following examples illustrate the invention and evidence certain experimental details.

Example 1

Pure chloral is prepared by de-hydrating commercial chloral hydrate. The monomer aldehyde is obtained by distilling $Cl_3C$—CHO, $H_2O$ on concentrated $H_2SO_4$. The pure product thus obtained (B.P.=96°–98° C.) is preserved in a moisture-free medium.

Purified natural rubber (percent nitrogen <0.1, percent ash <0.3) mixed beforehand during 2 minutes to facilitate its solution is used. 2 grams of this polymer are introduced into a thick sealable Pyrex glass tube and dissolved in 60 cc. of anhydrous cyclohexane. Then 2.2 gr. of pure chloral and 0.06 gr. of freshly sublimated $AlCl_3$ are added. The quantity of aldehyde utilized in this example corresponds to a molar ratio $r$=1. The relationship is $r$=$M/m$ wherein M=molecular mass of the aldehyde; in the case of chloral M=147.5, and $m$=mass of the elementary unit of the macromolecular chain; in the case of natural rubber $(C_5H_8)$ $n$ we have $m$=68.

The Pyrex tube is cooled in liquid nitrogen and then cleared by using a vacuum pump to reduce the pressure to the value corresponding to about 1 mm. Hg. Then deoxygenated or so-called "R" nitrogen is delivered into the tube, and vacuum is restored therein. This operation is repeated three or four times and the tube is eventually sealed under a pressure of the order of $10^{-2}$ mm. Hg. The reaction is produced by heating in an oil bath regulated by thermostate control at 180° C. during two hours. The reaction mixture is poured into 300 cc. of methanol. The light-brown precipitate is washed with acetone, dissolved in chloroform and again precipitated and washed. Then the product is dried in vacuo (5 mm. Hg) in a bath, with the assistance of Silicagel and activated carbon. Its elementary composition is then determined:

| | Percent C | Percent H | Percent O | Percent Cl |
|---|---|---|---|---|
| Product | 71.68 | 9.80 | 3.30 | 14.5 |
| Reference rubber sample | 87.25 | 11.35 | 0.85 | |

The chlorine content permits of calculating the amount of chloral having been fixed during the process, as well as the rate of fixation $n$ as defined hereinabove: $n$=10.4.

Of course, according to the conditions in which the experiment is carried out (temperature, initial molar ratio $r$) different rates of fixation $n$ may be obtained.

It is also possible to vary the nature of the catalyst. With the above-described conditions of operation, the corresponding fixation rates are for example: $AlCl_3$:$n$=11; $BF_3$:$n$=11.5; $FeCl_3$:$n$=4; $SbCl_3$:$n$=3; $ZnCl_2$:$n$=1.5.

Example 2

In a 1000 cc. three-neck flask provided with a mechanical agitator, a nitrogen inlet and a reflux cooler protected aginst moisture, four grams of natural rubber purified in 400 cc. of anhydrous cyclohexane are dissolved in a nitrogen atmosphere. Then, 5.8 gr. of pure chloral ($r$=0.6) and 2 cc. of the $BF_3$—$(C_2H_5)_2O$ compound are added carefully. The mix is homogenized and heated at 60° C. during five hours. Then the solution is poured into 1200 cc. of methanol. The brown precipitate is purified as set forth in Example 1 hereinabove. The elementary analysis of this modified rubber gives the following figures: C=79.07%; H=10.73%; O=1.88%; Cl=8.1%.

The corresponding rate of fixation is $n$=6.1.

Example 3

75 gr. of light-colored crepe rubber are introduced into a 3-liter autoclave equipped with an agitator. The rubber was mixed beforehand during 5 minutes on cooled rolls; then the mix is dissolved in 1,500 cc. of Decalin. The solvent was deperoxidized by treating same with ferrous sulphate, then dehydrated by boiling on sodium. The polymer is dissolved during 24 hours at room temperature while stirring, the apparatus having been purged beforehand with "R" nitrogen. Then 160 gr. of pure chloral ($r$=1.1) and 2.3 gr. of anhydrous aluminum chloride are introduced. The mixture is heated during 2 hours at 175° C.

The modified polymer solution is poured into 3 liters of methanol, the raw precipitate being subsequently purified and dried as set forth in Example 1. The amount of chlorine determined by analysis (Cl=14.1%) corresponds to a rate of fixation $n$=10.

Example 4

In 100 gr. of natural rubber, 50 gr. of finely pulverized chloral hydrate are introduced by mixing, every necessary cares being taken to protect the operator from the agressiveness of the product; thus, the mixer rolls are kept at a temperature approximating 60° C. 16 gr. of this mixture are then heated at 205° C. during one hour in a metal flask. The resulting brown-black mixture is extracted by using a Soxhlet apparatus and firstly water and then acetone. After drying, the analytical tests show a fixation rate $n$=8.

Example 5

The same procedure as in Example 4 is adhered to, but in addition 1% of anhydrous $ZnCl_2$ is added by mixing as a catalyst. After heating at 200° C. during one hour, the fixation rate rises to $n$=11.

Example 6

The steps disclosed in Example 1 are generally applied in this example, but cis-polybutadiene is substituted for natural rubber.

The specific structure of this synthetic polymer permits a chloral fixation promoted more by a peroxidic catalyst then by a ionic catalyst.

(a) A mixture consisting of 0.6 gr. of purified polybutadiene, 1.7 gr. of anhydrous chloral and 0.012 gr. of aluminium chloride is heated in a sealed tube, the reaction temperature is 180° C. (two hours):

After the conventional purification treatments, the modified polybutadiene is found to have a 4.5% chlorine content, corresponding to a fixation rate $n=2$.

(b) The operating method is that disclosed in Example 2 hereinabove. A solution consisting of 3 gr. of purified polybutadiene, 8 gr. of pure chloral and 0.1 gr. of benzoyl peroxide in 100 cc. of anhydrous cyclohexane is heated at 60° C. during 6 hours. The product thus obtained corresponds to a rate of fixation $n=3.9$.

The products resulting from the combination of chloral with natural rubber have been examined according to the infra-red spectrographic techniques. It appears that the chemical modification advocated by the present invention consists in fixing —CHOH—CCl$_3$ groups on a variable number of C$_5$H$_8$ units of the rubber chain.

According to the transformation described in this specification, the change is from structure A (natural rubber) to structure B (modified rubber). The number of C$_5$H$_8$ units thus transformed varies as a function of experimental conditions:

$$\ldots -CH_2-\underset{\underset{CH_3}{|}}{C}=CH-CH_2-CH_2-\underset{\underset{CH_3}{|}}{C}=CH-CH_2 \ldots$$

A. Natural rubber $$\ldots -CH_2-\underset{\underset{CH_3}{|}}{C}=CH-CH_2-CH_2-\underset{\underset{\underset{CHOH-CCl_3}{|}}{CH_2}}{\overset{\|}{C}}-CH-CH_2 \ldots$$

B. Modified rubber.

It is noted that structure B displays, besides the —OH and —CCl$_3$ groups due to the fixation of chloral, double links of a novel type $$-\underset{\underset{CH_2}{\|}}{C}-$$

which are available for specific reactions.

The properties of the products described herein vary as a function of the rate of fixation. In comparison with a non-modified natural rubber they are characterized as a rule by a modification of the solubility in esters, ketones and more particularly pyridine. Moreover, in the case of high rates of fixation ($n>20$) they are incombustible.

The following examples (which are also given by way of illustration, not of limitation) set forth the inherent chemical reactivity of these products.

Example 7

In a balloon flask equipped with an agitator and a reflux cooler protected against humidity, 1 gr. of a rubber modified by chloral as set forth in Example 1 is dissolved in 100 cc. of anhydrous xylene. Then 0.8 gr. of sodium finely dispersed in 50 cc. of xylene is added. The mixture is heated during one hour at 130° C. During the heating step the chlorine atoms are stripped in the state of ClNa with consequent reticulation of the treated product which precipitates in the form of a yellow powder. After cooling the excess sodium is destroyed by the addition of ethyl alcohol and the precipitate collected by filtering through in nylon cloth. The product thus obtained is insoluble in all organic solvents, even by boiling.

Example 8

A solution consisting of 0.5 gr. of a rubber-chloral (Example 1) is refluxed in 100 cc. of anhydrous toluene in the presence of 4 gr. of adipic acid dichloride which fixes as a bridge on the OH groups of the chloral-rubber chains. The derivative thus precipitated is insoluble in aromatic and hydroxylated solvents.

Example 9

The same steps as in Example 8 are carried out except that hexamethylene di-isocyanate is substituted for the adipyl dichloride. A reticulation of the modified rubber is also obtained in this case.

The above Examples 7, 8 and 9 illustrate the possibilities of specific reactions of the polymers modified by the chloral or the α-halogenated aldehyde.

Example 10

The experimental process described in Example 2 is followed, the elastomer consisting of commercial butyl rubber of which the iodine number calculated experimentally is $I=13$. In the presence of a catalyst such as etherate of boron trifluoride or aluminium chloride, 4.5% of chloral are fixed on the butyl rubber. The reaction is obtained in cyclohexane by heating at 60° during eight hours. 2 gr. of the resulting product are heated in toluene up to the boiling point in the presence of 0.3 gr. of metal sodium. The chlorine fixed on the chain of the modified elastomer is stripped in the form of NaCl, thus causing the reticulation of the butyl.

Example 11

This example comprises the same steps as Example 2 hereinabove. A mixture consisting of 3.4 gr. of natural rubber and 14 gr. of monomer bromal dissolved in 350 cc. of anhydrous cyclohexane is heated under reflux conditions in a nitrogen atmosphere.

The pure aldehyde was prepared by distilling off the commercial product over concentrated sulfuric acid.

The catalyst untilized in this case is Br$_3$Al (0.4 gr.).

After purification the bromine content of the modified rubber is Br=27%, corresponding to a rate of fixation $n=11$.

This invention is also concerned with the combination of the above-mentioned polyenes with aldehydes carrying carbonyl or epoxide groups.

Example 12

Pure methylglyoxal is prepared by oxidizing acetone by means of selenium dioxide.

The process is the same as in Example 1. In a sealable tube 1.2 gr. of purified rubber are dissolved in 50 cc. of anhydrous xylene. 25 cc. of a 5% solution of methylglyoxal in xylene are added thereto. The tube is heated at 210° C. during 1 hour. After purifying and drying the reaction product, the elementary analysis (O=5.02%) gives a rate of fixation $n=7$.

Example 13

The same procedure as in Example 2 is adhered to. 3 gr. of natural rubber are dissolved in 150 cc. of cyclohexane. 3.2 gr. of glycidic aldehyde and 1 cc. of the BF$_3$—(CH$_3$CO)$_2$ compound are added thereto, the mix being kept at 60° C. during six hours. After purification, the rate of oxygen of the product (O=6.3%) is $n=13$.

By heating this product in a benzene-and-water emulsion in the presence of H$_2$SO$_4$, a new derivative (O=9.75%)

is obtained which results from the hydrolysis of the preceding product.

On the other hand, it is known tha α-halogenated aldehydes such as chloral can be combined with simple aromatic hydrocarbons (such as chlorobenzene) in the presence of non-catalytic amounts of acids (H$_2$SO$_4$) or metal chlorides (AlCl$_3$). This method may be used for instance for preparing the compound known under the trade name of DDT (dichloro-diphenyl-trichloroethane). It has been applied so far neither to polystyrolenes nor to styrolene-olefin copolymers, in general. The applicants' works led to the conclusion that it is also applicable to this entire class of products.

Therefore, this invention is also concerned with the preparation of polymers obtained from derivatives of styrolene as set forth hereinabove, which may occur in the form of elastomers or plastic materials according to the quantity and nature of the combined aldehyde. The improvement resulting from the chemical transformation described in the present invention applies notably to the following points:

Improvement of the resistance to certain solvents, to acids and bases.

Incombustibility of the products modified by large amounts of halogenated aldehydes.

Improvement of the compatibility with aminoplasts, phenoplasts, etc.

Possibility of producing new chemical reactions from polymers prepared according to this process, notably the reticulation by means of multi-functional reagents such as diamines, di-isocyanates, inorganic derivatives of polyvalent elements (ZnO, MgO) permitting a characteristic curing of each structure.

It is recommended to avoid breaks in the hydrocarbon chain which may be caused by the heat treatment generally necessary in the reaction, by operating in the absence of any atmospheric oxygen. According to the quantity of products implemented the process may be carried out in a sealed tube, in an autoclave or in any similar apparatus in an inert atmosphere (argon, nitrogen); a specific technique permits of effecting a strong stirring of the reagents shielded from the atmospheric air in a special mixer. It is also recommended to operate with anhydrous reagents, catalysts and reaction media.

The reaction requires the presence of catalysts which may be selected from the group of inorganic or organic, strong and anhydrous acids (e.g. HCl, oleum, trichloracetic acid, formic acid, and sulfonic paratoluene acid), but preferably anhydrous metallic halides will be used such as $AlCl_3$, $AlBr_3$, $ZnCl_2$, $FeCl_3$, $SnCl_4$, $BF_3$. These last-named halides may be used either separately or in the form of eutectics such as $AlCl_3$—NaCl, or still better in the form of compounds active at low temperature, obtained by combining the halides with nitrobenzene, nitromethane, etc.

The reactions are effected according to circumstances with the monomer aldehyde or with an aldehyde derivative capable of regenerating the aldehyde by simply heating same (polymer or hydrate). The high polymer which is to undergo the chemical modification may be used in the solution, emulsion or solid form. In all cases, the atmospheric oxygen is removed from the reaction medium; this result may be obtained by degassing in vacuo or removing the air by means of an inert gas such as nitrogen, argon, etc. It may be important to purify before the reaction the products resulting from the homo-polymerization of styrolene or from its copolymerization with a diene. The purification treatment consists in performing a series of extractions by means of polar solvents, of solutions in aromatic or halogenated solvents, and of reprecipitation by using methanol, ethanol or any other suitable substance.

The solution reactions take place in inert solvents such as anhydrous and peroxide-free cyclohexane or decalin. The reactions take place in a tube sealed in nitrogen vacuo or under ordinary pressure in an inert atmosphere. The combination of the aldehyde with the polymer is obtained in the following temperature ranges: according to the desired rate of modification and the nature of the catalyst, between about 20° C. and about 200° C. when catalysts activated by the formation of complexes with the nitro-methane or nitrobenzene for instance, are used, and between about 50° C. and about 240° C. when the catalyst is used alone or in the form of eutectic. Upon completion of the reaction the modified polymer is precipitated from its solution by the addition of a non-solvent substance such as methanol. The purification of the product consists in eliminating the excess of unreacted aldehyde as well as the catalyst. This purification is obtained by extracting the product by means of a solvent of the aldehyde (water, acetone, alcohols, etc.) that will not dissolve the polymer or still by restoring to a series of successive solutions of the modified polymer (in benzene, chloroform, etc.) and reprecipitations (in alcohols). The purified product is dried in vacuo until its weight becomes constant and its elementary composition is determined by resorting to the conventional analytical means, notably the halogen content; the percentage by weight of aldehyde fixed on the polymer is thus calculated. Moreover, spectrographic examinations in the infra-red spectrum permit of designating the nature and density of the chemical groups introduced into the thus modified polymer.

According to a modified embodiment of the reaction process, it is also possible to operate in the solid phase. In this case, there is introduced by mixing into a styrolene-butadiene copolymer the derivatives of the aldehyde which are capable of regenerating this aldehyde by simply heating same. These derivatives are for example chloral hydrate or metachloral. The reaction is obtained by heating the mixture in metal flasks (during 30 minutes to 3 hours at a temperature ranging from 150° C. to 220° C.) or still in a special mixed (for example the above-mentioned Buss Ko-mixer) permitting a very strong mixing of the reagents practically shielded from atmospheric air (heating at 150° C. to 220° C. during 3 to 30 minutes). The thus modified polymers are purified in the manner already set forth hereinabove.

It is thus clear that the present invention relates, inter alia, to the combination of α-halogenated aldehydes of which a typical example is chloral (chloral, bromal, fluoral) with the aromatic nuclei contained in the polymers or copolymers obtained from styrolene, the reaction being effected by using considerable amounts of catalyst. The preferred catalyst is anhydrous aluminum chloride. It is used in variable proportions from $m=0.1$ to $m=10$. The best results are obtained with $m$ values approximating 1.

$m$ is designated as the initial molar ratio of the catalyst to the aromatic nuclei contained in the polymers or copolymers obtained from styrolene.

The quantity of aldehyde thus fixed depends on the number of aromatic nuclei present in the high polymer; more or less modified products may be prepared from polymers containing initially different contents of combined styrolene. It is also possible to vary the rate of fixation by introducing more or less aldehyde into the reaction medium (according to the molar ratio $p$ defined hereinafter: initial molar ratio of the aldehyde to the aromatic nuclei contained in the high polymer).

The following examples, not to be construed as limiting the invention, illustrate the manner in which the method of this invention may be carried out in the case of polystyrolenes and olefin-styrolene copolymers.

Example 14

In a tube adapted to be sealed (or in a polymerization flask or bottle) 5 gr. of SB–R, butadiene-styrolene copolymer containing 23.5% of combined styrolene, purified beforehand, are introduced after dissolving in 190 cc. of cyclohexane (3% by weight of SB–R with respect to the solvent). Then the anhydrous chloral is introduced in such amount that the initial molar ratio with respect to the aromatic nuclei present in the solution be $p=5$ (8.5 gr.) and subsequently the freshly prepared (or sublimated) and well dried aluminum chloride is introduced in such amount that the initial molar ratio with respect to the present aromatic nuclei be $m=1$ (1.56 gr.).

The tube is then cooled in liquid nitrogen and vacuumized (to 1 mm. Hg.) in a de-oxygenated nitrogen atmosphere (R nitrogen), and then the tube is sealed in vacuo. It is heated slowly and stirred for homogenizing the content. The reaction is obtained by heating in an oil bath kept at 180° C. during 120 mn. Then the tube is broken and the high polymer is reprecipitated by using a non-solvent substance thereof (for example methanol or ethanol). The reaction product is purified by extracting in succession with ethanol and acidulated water (by using diluted acetic acid, for instance) to eliminate the excess of unreacted chloral as well as the aluminum chloride.

After purifying and drying the modified SB-R, the rate of chloral fixation is calculated by measuring the proportions of combined chlorine according to the Charpentier-Volbard method after an oxidizing mineralization of the halogen in Parr's flask. The combined chloral calculated from the chlorine content is 20.6% by weight in relation to the modified SB-R. The maximum theoretical amount of chloral likely to be combined with this type of SB-R is 25.6%, assuming that only one molecule of chloral is fixed per aromatic nucleous. Under these conditions the reaction efficiency is 80.4%.

The resulting product is in the form of a yellow powder. An increase in the solubility of the thus modified SB-R in aminated solvents such as pyridine in relation to the initial SB-R is obtained, as well as a definite improvement in the resistance to flame propagation.

On the other hand, this new copolymer when treated with alcoholic potash produces aldehyde functions leading to carboxylic functions by oxidation (Example 8). Functional reticulations may also be obtained with diamines, di-isocyanates, etc.

Example 15

The operating conditions being the same as in Example 1, a new catalyst is used; aluminum chloride is replaced with boron trifluoride (in the form of a compound for example with ethyl oxide) in such amount that the initial molar ratio be $m=1$ (1.65 gr.).

The combined chloral calculated from the chlorine content is 21% by weight in relation to the modified SB-R. Under these conditions the efficiency of the reaction is 82%.

The resulting product has the same properties as the product obtained with the method disclosed in Example 1.

Example 16

The operating conditions being the same as in Example 1, the reaction temperature is set at 60° C. and the reaction time is 120 mn.

The combined chloral calculated from the chlorine content is 7.5% by weight in relation to the modified SB-R. The reaction efficiency is therefore 29.3%.

The product thus obtained has a rubber-like appearance intermediate those of the initial SB-R and the products obtained with the steps described in Examples 1 and 2.

Example 17

The operating conditions being the same as in Example 1, the styrolene-butadiene copolymer with 2.5% of combined styrolene is replaced by a copolymer containing 85% of styrolene (5 gr.) which is dissolved in 190 cc. of cyclohexane. Then the anhydrous chloral is introduced in such amount that the initial molar ratio in relation to the aromatic nuclei present in the mix be $p=5$ (30.2 gr.) and $AlCl_3$ is introduced in such amount that the initial molar ratio in relation to the aromatic nuclei be $m=1$ (5.5 gr.).

The combined chloral is equal to 41% by weight in relation to the modified SB-R. The maximum theoretical amount of chloral that could be combined by addition to this type of SB-R is 54.5%. Therefore, the efficiency of the reaction is 75.1%.

The resulting product has the appearance of a brown powder dissolving easily in pyridine and having a good resistance to flame propagation.

Example 18

The operating conditions being the same as in Example 1, the styrolene-butadiene copolymer is replaced by polystyrene (5 gr.) dissolved in 190 cc. of cyclohexane. 35.5 gr. of anhydrous clhoral ($p=5$) and subsequently 6.4 gr. of $AlCl_3$ ($m=1$) are introduced.

The combined chloral is 43.5% by weight in relation to the modified polystyrolene. The maximum theoretical chloral rate which could be fixed by addition on each aromatic nucleous (1 mole per nucleous) is 58.6% by weight in relation to the modified polystyrolene. The reaction efficiency is thus 74.2%.

Example 19

5 gr. of polystyrene are introduced into a flask containing 35.5 gr. of anhydrous cloral ($p=5$), then 6.5 gr. of anhydrous $ZnCl_2$ ($m=1$) are also introduced, the operating conditions being otherwise the same as in Example 1. The combined chloral corresponds to 18% by weight of the modified polystyrolene.

Example 20

A mixture consisting of 300 g. of SB-R (23.5% of combined styrolene) with 150 gr. of hydrate of chloral pulverized to a fine mesh particle size is prepared, every cares being taken to protect the operators against the aggressiveness of the product; the mixer rolls are kept at a temperature approximating 40° C.

Then this mixture is introduced by small quantities into a Buss Ko-mixer heated at 180° C. The reaction time four minutes. (It is also possible to modify the reaction temperature and time to vary the rate of fixation of the chloral). In this case no catalyst is used. In fact, due to the partial decomposition of the hydrate of chloral, some HCl is released which acts as a catalyst in this reaction.

After purification according to the methods already described hereinabove, it is found that the fixed chloral amounts to 15% by weight in relation to the modified SB-R. Under these conditions the reaction yield is 58.5%.

According to the transformation described in this specification, it is clear that the change is from the purely hydrocarbonic structure A (polytsyrolene or butadiene-styrolene copolymer) to structure B characterized by the presence of —CHOH—CCl₃ residues fixed on the aromatic nuclei.

Structure A: (butadiene-styrolene copolymer):

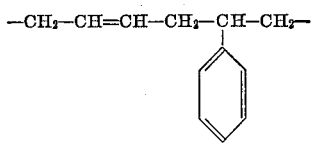

Structure B:

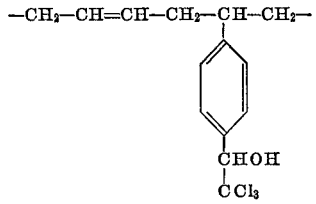

Example 21 proves that it is possible to obtain new macromolecular structures from the thus modified products.

Example 21

Alcohol potash is caused to react on the butadiene-styrolene copolymer containing 23.5% of styrolene modified by 21% of chloral (Example 2). In fact, it is known that compounds of the R—CHOH—CCl₃ type (R being a hydrocarbonic residue) release chloroform (CHCl₃) and produce R—CHO type structures under the influence of alcohol potash.

1 gr. of this modified copolymer is dissolved in 100 cc. of toluene. 50 cc. of 2 N alcohol potash are added; the solution is heated during 2 hours under reflux conditions, and the released chloroform is entrained by using water steam. The chloroform is identified by the formation of carbylamine (by reaction with an amine in an alkaline medium). The polymer which then corresponds to a structure C shown hereinafter is isolated from the reaction medium.

Structure C

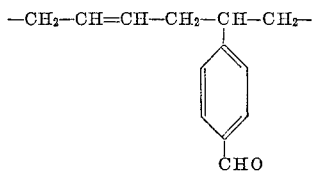

The polymer corresponding to structure C is adapted, by subsequent oxidation, to produce a copolymer having carboxylic functions (Structure D).

Structure D

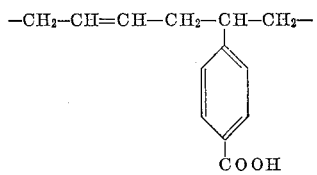

Through simple reactions it is thus possible to transform chloral-modified butadiene-styrolene copolymers by displaying on the aromatic nuclei carboxylic functions capable of producing functional reticulations.

What we claim is:

1. A method of modifying a polymer selected from the group consisting of natural rubber, isobutylene-isoprene copolymers, polybutadiene, butadiene-styrene copolymers and polystyrene which consists of reacting said polymer in an inert atmosphere at a temperature of about 80° C. to about 240° C. with a polyfunctional aldehyde selected from the group consisting of chloral, bromal, fluoral, methylglyoxal, glycidic aldehyde, 4 - fluorobenzaldehyde and 2,4 - dichlorobenzaldehyde, said aldehyde being used in a quantity sufficient to yield a modified polymer having fixed thereon at least about 1.5 aldehyde molecules per 100 monomer units of said polymer.

2. A method according to claim 1, in which said polyfunctional aldehyde is chloral.

3. Modified polymers produced by the method of claim 1.

4. A method of modifying a polymer selected from the group consisting of natural rubber, isobutylene-isoprene copolymers, polybutadiene, butadiene-styrene copolymers and polystyrene which consists of reacting said polymer in an inert atmosphere at a temperature of about 50° to about 240° C., in the presence of an ionic catalyst, with a polyfunctional aldehyde selected from the group consisting of chloral, bromal, fluoral, methylglyoxal, glycidic aldehyde, 4 - fluorobenzaldehyde and 2,4 - dichlorobenzaldehyde, said aldehyde being used in a quantity sufficient to yield a modified polymer having fixed thereon at least about 1.5 aldehyde molecules per 100 monomer units of said polymer.

5. A method of modifying a polymer selected from the group consisting of natural rubber, isobutylene-isoprene copolymers, polybutadiene, butadiene-styrene copolymers and polystyrene which consists of reacting said polymer in an inert atmosphere at a temperature of about 20° C. to 200° C., in the presence of an ionic catalyst activated by the formation of complexes with nitromethane or nitrobenzene, with a polyfunctional aldehyde selected from the group consisting of chloral, bromal, fluoral, methylglyoxal, glycidic aldehyde, 4 - fluorobenzaldehyde and 2,4 - dichlorobenzaldehyde, said aldehyde being used in a quantity sufficient to yield a modified polymer having fixed thereon at least about 1.5 aldehyde molecules per 100 monomer units of said polymer.

References Cited

UNITED STATES PATENTS

| | | | |
|---|---|---|---|
| 2,611,760 | 9/1952 | Geiser | 260—73 |
| 2,634,256 | 4/1953 | Sparks et al. | 260—73 |
| 2,953,547 | 9/1960 | Patterson et al. | 260—73 |
| 2,962,479 | 11/1960 | Aldridge et al. | 260—73 |
| 2,931,845 | 4/1960 | Lehmann et al. | 260—747 |

JAMES A. SEIDLECK, *Primary Examiner.*

U.S. Cl. X.R.

260—77.5, 845, 846, 852